(12) United States Patent
Buell

(10) Patent No.: US 6,297,597 B1
(45) Date of Patent: Oct. 2, 2001

(54) EL DRIVER WITH LOW SIDE CURRENT MIRRORS

(75) Inventor: Brian Jeffrey Buell, Gilbert, AZ (US)

(73) Assignee: Durel Corporation, Chandler, AZ (US)

( * ) Notice: Subject to any disclaimer, the term of this patent is extended or adjusted under 35 U.S.C. 154(b) by 0 days.

(21) Appl. No.: 09/549,488

(22) Filed: Apr. 14, 2000

(51) Int. Cl.[7] .................................................. H01J 1/62
(52) U.S. Cl. ................................. 315/169.3; 326/33
(58) Field of Search ........................ 315/169.3, 169.2, 315/209 R, 200 R; 326/33, 64–67, 77

(56) References Cited

U.S. PATENT DOCUMENTS 5,682,108 * 10/1997 Min ........................................ 326/64
5,821,701 * 10/1998 Teggatz et al. ..................... 315/169.3
5,942,856 * 8/1999 Koyama ............................. 315/169.3

* cited by examiner

Primary Examiner—Don Wong
Assistant Examiner—Wilson Lee
(74) Attorney, Agent, or Firm—Paul F. Wille

(57) ABSTRACT

A driver for an EL lamp includes a source of high voltage coupled to a first voltage rail and a second voltage rail and a transistor bridge output coupled to the rails, wherein the bridge output has no current mirrors for the high side transistors in the bridge output.

3 Claims, 3 Drawing Sheets

EL DRIVER WITH LOW SIDE CURRENT MIRRORS

BACKGROUND OF THE INVENTION

This invention relates to a battery operated power supply for an electroluminescent (EL) lamp and, in particular, to a driver having an H-bridge output in which the high side switches are not controlled by current mirrors.

An EL lamp is essentially a capacitor having a dielectric layer between two conductive electrodes, one of which is transparent. The dielectric layer may include a phosphor powder or there may be a separate layer of phosphor powder adjacent the dielectric layer. The phosphor powder radiates light in the presence of a strong electric field, using very little current. Because an EL lamp is a capacitor, alternating current must be applied to the electrodes to cause the phosphor to glow, otherwise the capacitor charges to the applied voltage, the current through the EL lamp ceases, and the lamp stops producing light.

In portable electronic devices, automotive displays, and other applications where the power source is a low voltage battery, an EL lamp is powered by a driver that converts direct current into alternating current. In order for an EL lamp to glow sufficiently, a peak-to-peak voltage in excess of about one hundred volts is necessary. The actual voltage depends on the construction of the lamp and, in particular, the field strength within the phosphor powder. The frequency of the alternating current through an EL lamp affects the life of the EL lamp, with frequencies between 200 hertz and 1000 hertz being preferred. Ionic migration occurs in the phosphor at frequencies below 200 hertz. Above 1000 hertz, the life of the phosphor is inversely proportional to frequency.

The prior art discloses several types of drivers including an inductive boost circuit having an inductor in series with a switching transistor. Current through the inductor causes energy to be stored in a magnetic field around the inductor. When the current is abruptly shut off, the induced magnetic field collapses, producing a pulse of high voltage. The voltage across the inductor is proportional to $L \cdot {}^{67} I_{67 \, r}$. Thus, a low voltage at high current is converted into a high voltage at low current. The voltage on the lamp is pumped up by a series of high voltage pulses from the boost circuit.

The direct current produced by the driver must be converted into an alternating current in order to power an EL lamp. It is known in the art to use a switching bridge, called an H-bridge, to alternate the current through the lamp. The bridge operates like a double pole, double throw switch to alternate the polarity of the current through the lamp at a low frequency (200–1000 hertz).

It is known that an EL lamp can act like small electrostatic speaker when electrical pulses are applied to the lamp. It is also known to control the charge and discharge current through an EL lamp to minimize noise generated by the lamp. When a driver is implemented as an integrated circuit, the prior art uses current mirrors to control current through the switching transistors in an H-bridge, thereby reducing the noise generated by an EL lamp.

Although a substantial portion, or all, of an EL driver is typically implemented as an integrated circuit for reduced costs, further improvement in cost and efficiency is desired to meet market expectations of declining prices and improving performance. One measure of efficiency is the amount of power delivered to a lamp compared to the total power consumed by the driver. (Other measures of efficiency relate light output to power consumption and involve considerations not relevant here, such as lamp structure, pulse frequency, and wave shape.)

In view of the foregoing, it is therefore an object of the invention to improve the power efficiency of an EL driver.

Another object of the invention is to reduce the cost of an EL driver.

A further object of the invention is to reduce the current drawn by an EL driver.

SUMMARY OF THE INVENTION

The foregoing objects are achieved in this invention in which a driver for an EL lamp includes a source of high voltage coupled to a first voltage rail and a second voltage rail and a transistor bridge output coupled to the rails, wherein the bridge output has no current mirrors for the high side transistors in the bridge output.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
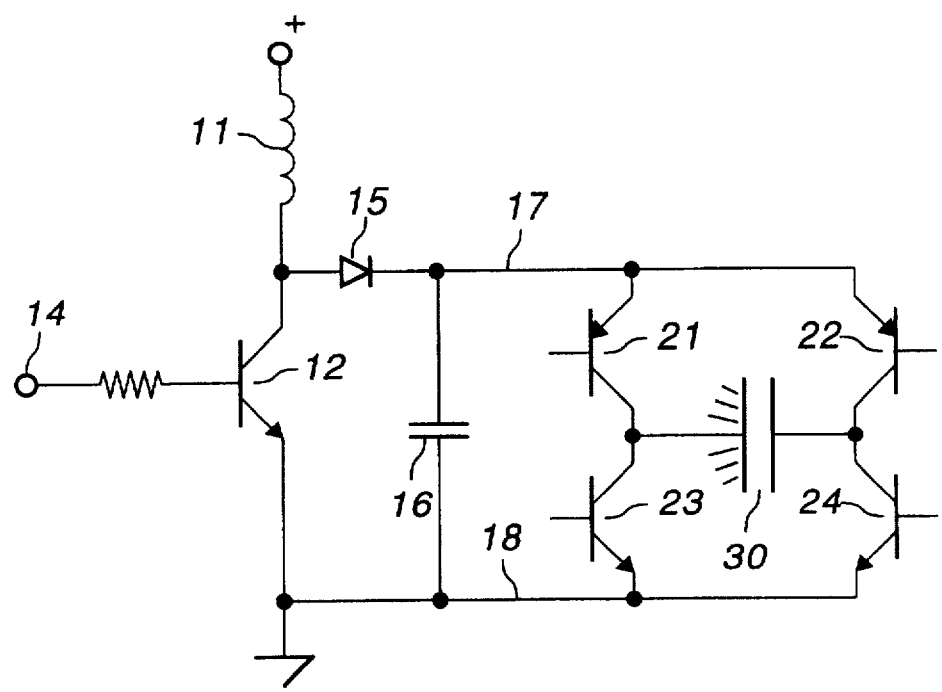
FIG. 1 is a schematic of an EL driver constructed in accordance with the prior art.

FIG. 1 is a schematic of an EL driver having an inductive boost and an H-bridge output. The inductive boost includes inductor 11 in series with switching transistor 12 between a source of low voltage (not shown) and ground. Pulses on input 14 cause transistor 12 to switch on and off, producing a series of high voltage pulses that are coupled by diode 15 to storage capacitor 16. The terminals of capacitor 16 form high voltage rail 17 and common rail 18. A switching bridge including transistors 21, 22, 23, and 24 is coupled between high voltage rail 17 and common rail 18. The AC diagonal of the switching bridge is coupled to EL lamp 30. A number of kinds of pulse generators (not shown) for driving input 14 and the switching bridge are known in the art.

Figure 2:
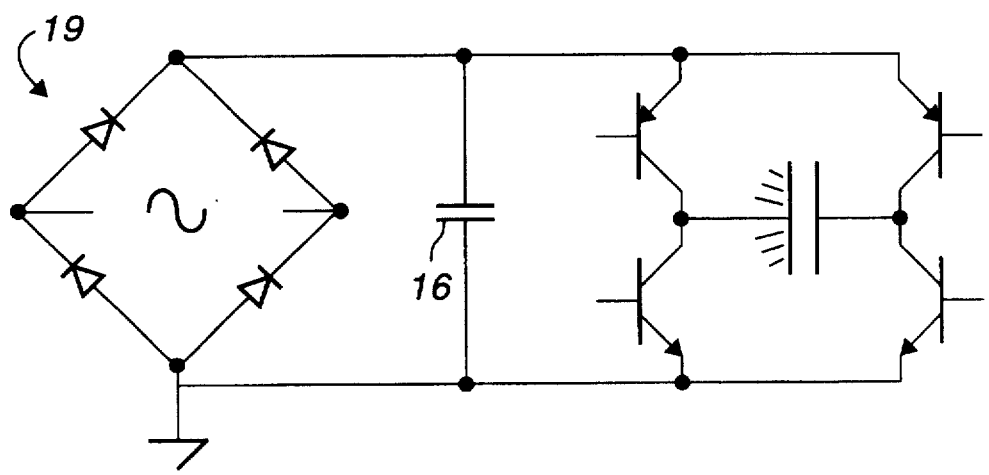
FIG. 2 is a schematic of an EL driver powered by line voltage and constructed in accordance with the prior art.

FIG. 2 is a schematic of a driver coupled to line voltage, i.e. an AC power line. The alternating current is rectified in diode bridge 19, charging capacitor 16. This invention is concerned with the bridge portion of a driver, which can have any suitable means for producing a high voltage across rails 17 and 18. If desired, a split supply can be used, such that neither rail 17 nor rail 18 is grounded.

Figure 3:
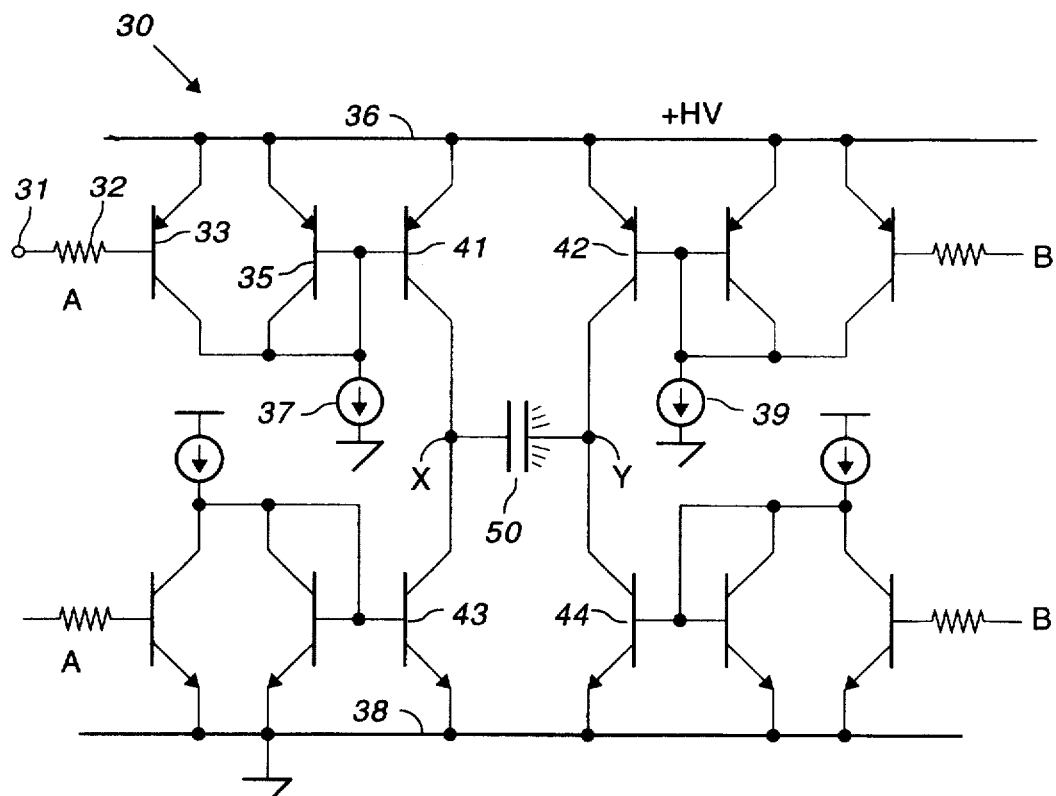
FIG. 3 illustrates the output section of an EL driver constructed in accordance with the prior art.

FIG. 3 illustrates H-bridge 30 as implemented in an integrated circuit. Input 31 is coupled through resistor 32 to transistor 33. Transistor 33 and transistor 35 are coupled in parallel between high voltage rail 36 and current source 37, which is coupled to common rail 38. Transistors 35 and 41 form a current mirror whereby the current though transistor 41 is greater than but proportional to the current through transistor 35. The current through transistor 33 or transistor 35 is limited by current source 37. When input A is low, transistor 33 is turned on, bypassing transistor 35, which turns off. When input A is high, transistor 33 is off and transistor 35 conducts. The current through transistors 42, 43, and 44 is similarly controlled.

Transistors 41, 42, 43, and 44 are connected in an H-bridge configuration having +HV across the DC diagonal and EL lamp 50 across the AC diagonal of the bridge. The bridge is controlled by signals A and B such that opposite sides of the bridge conduct alternately; i.e. transistors 41 and 44 conduct while transistors 42 and 43 are non-conducting and transistors 42 and 43 conduct while transistors 41 and 44 are non-conducting.

Figure 4:
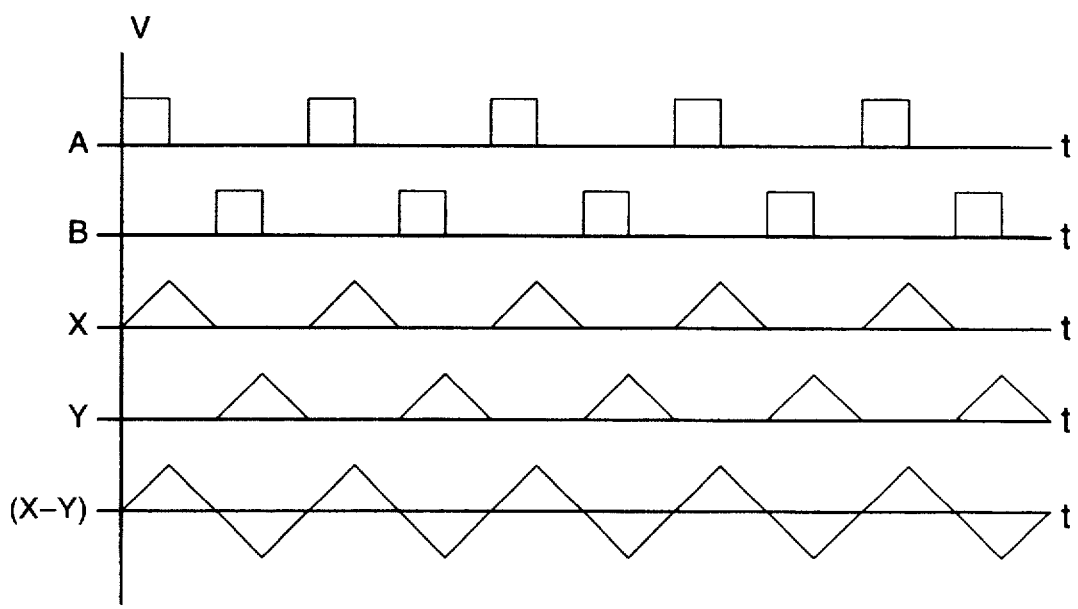
FIG. 4 is a series of waveforms illustrating the operation of the circuit shown in FIG. 3.

FIG. 4 illustrates control signals A and B and the voltages at points X and Y in FIG. 3, i.e. the voltage on each terminal of lamp 50 relative to ground. The voltage across lamp 50, the difference between the voltage on node X and the voltage on node Y, is also shown in FIG. 4. When circuit 30 is first started, there is no voltage across lamp 50 and nodes X and Y are brought to a voltage somewhere between +HV and common, regardless of which pair of transistors is conducting. Typically, the lower legs of an H-bridge are more conductive than the upper legs in the prior art.

Assuming that transistors 41 and 44 conduct initially, then node X charges toward +HV. At the end of the first charging period, node X is approximately at +HV volts and node Y is approximately at ground potential. When signal A goes low, transistor 41 shuts off and transistor 43 conducts, discharging lamp 50. When signal B goes high, transistors 42 and 43 conduct, oppositely charging lamp 50. When signal B goes low, transistor 42 shuts off and transistor 44 conducts, discharging lamp 50. From this time onward, the voltages on the nodes changes regularly in sawtooth waveforms and the voltage across lamp 50 also alternates in a sawtooth waveform.

The charge and discharge currents through transistors 41, 42, 43, and 44 are determined by the respective current mirrors and therein lies a problem. It has been found that the current drawn can be reduced significantly by eliminating the current mirrors on the high side switches; that is, on transistors 41 and 42.

Figure 5:
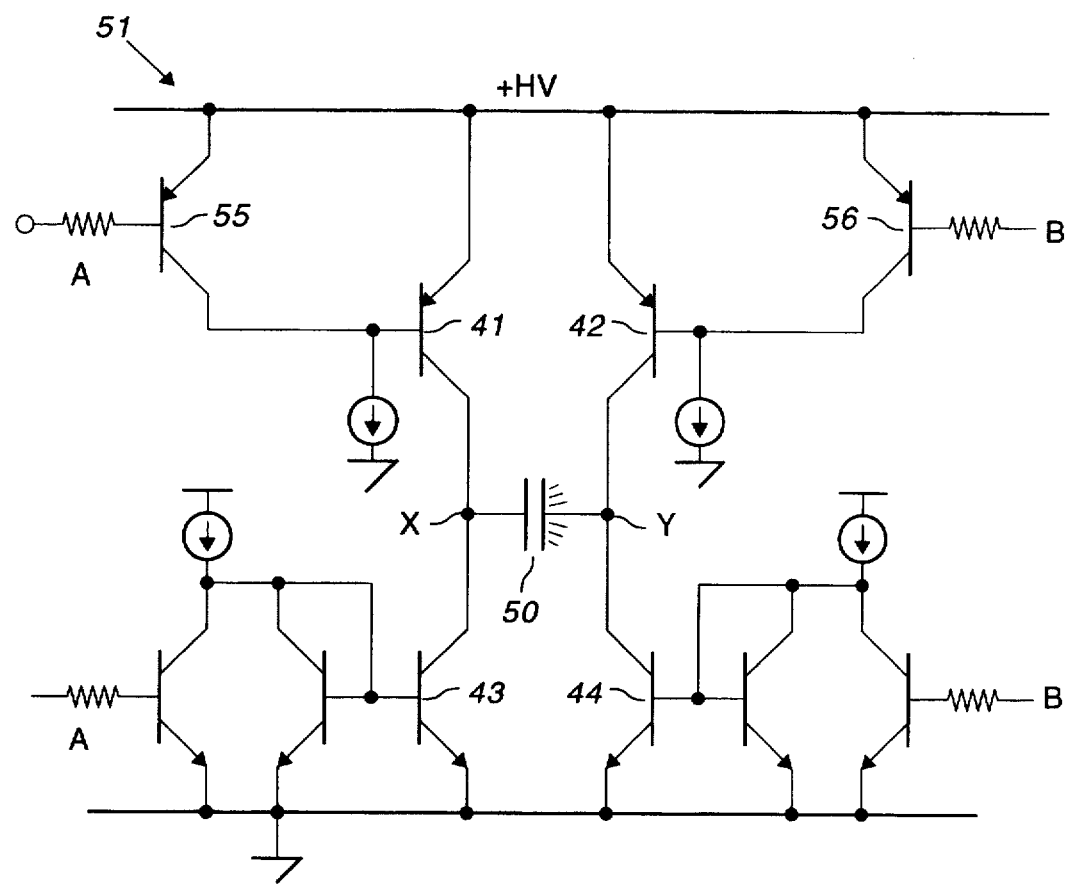
FIG. 5 illustrates the output section of an EL driver constructed in accordance with the invention.

As illustrated in FIG. 5, circuit 51 does not include current mirrors with transistors 41 and 42. Instead, transistor 55 is connected in cascade with transistor 41 and biases transistor 41 to be more conductive than transistor 44. Thus, current is limited by transistor 44 when transistors 41 and 44 are conducting. Similarly, transistor 56 is connected in cascade with transistor 42 and biases transistor 42 to be more conductive than transistor 44.

Figure 6:
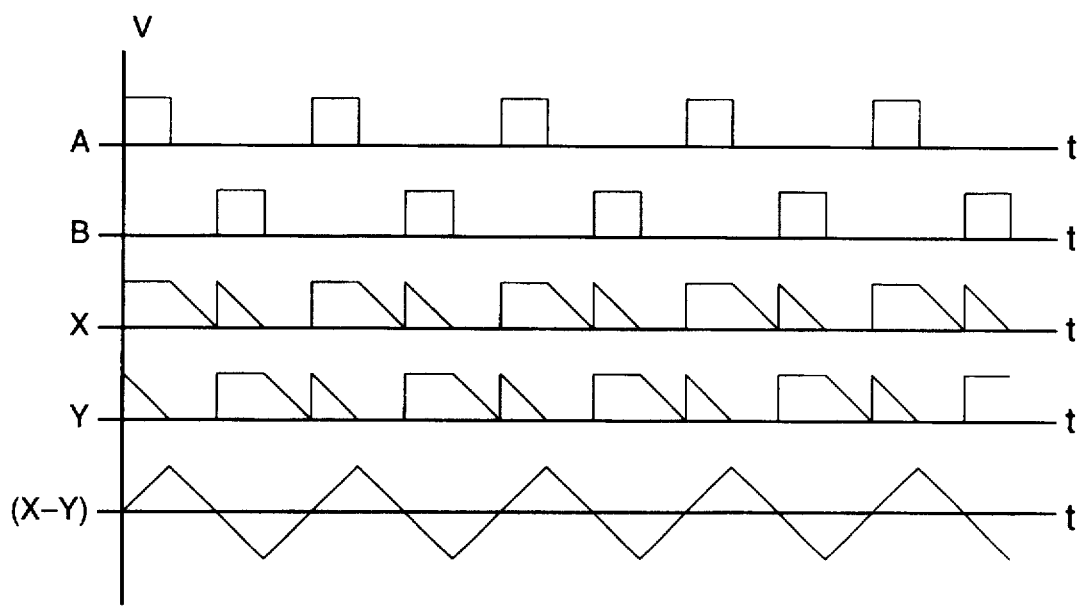
FIG. 6 is a series of waveforms illustrating the operation of the circuit shown in FIG. 5.

Because the high side switches have a higher conductance than the low side switches, the sides of a capacitive load are alternately pulled up toward the high voltage rail. The low side transistor then pulls the other side of the load to common at a controlled rate. This produces a unique*, easily detected, voltage pattern on the lamp terminals, as illustrated in FIG. 6, although the voltage across the lamp has the same pattern as in the prior art. 6 *(One could operate the circuit of FIG. 3 with the low side switches having a lower conductance than the high side switches and produce a waveform like that shown for X and Y in FIG. 6 but the lamp would not charge fully and the circuit would be significantly less efficient. The invention is not the waveform, the waveform is merely indicative of the invention.)

When circuit 51 is first turned on, there is no voltage across lamp 50 and nodes X and Y are raised to a voltage $1V_{sat}$ below +HV, regardless of which pair of transistors is conducting. Assuming that transistors 41 and 44 conduct initially, then node X remains at a substantially constant voltage while node Y discharges from +HV toward common. At the end of the first charging period, node X is approximately at +HV volts and node Y is approximately at ground potential. When signal A goes low, transistors 43 and 44 conduct, discharging lamp 50. When signal B is high, transistors 42 and 43 conduct. Node Y is brought to +HV and remains there while node X discharges from +HV to ground. When signal B goes low, transistors 43 and 44 conduct, discharging lamp 50. From this time onward, the voltages on the nodes change repeatedly as illustrated and the voltage across lamp 50 alternates in a sawtooth waveform.

The savings in die area and efficiency are calculated as shown in the following example, in which the transistors are assumed to have a beta of fifty as the worst case (beta is usually higher). Current mirrors having a ratio of 10:1 are assumed. This means that the total die area for each mirror is eleven times the area of the smaller transistor (1×+10×). To produce a charging current of i milliamperes, current source 37 must be i(1/10)+i(1/10)(1/50)+i(1/50)=0.122i milliamperes of bias current. This means that 12.2 percent of the charging current is required for biasing the current mirror and flows through current source 37 (FIG. 3) to ground.

The invention does not require a large scale-up transistor. The die area required is equivalent to a 2× or a 3× transistor. To produce a charging current of i milliamperes, the high side transistor must be given i(1/50)=0.02i milliamperes flowing through transistor 55. Only two percent of the charging current is required for biasing each high side transistor. Thus, the improvement in efficiency for the bridge portion of the driver is (1.122−1.02)/(1.122)=9%, a significant amount even with a worst case beta.

The beta of the transistors is subject to variation due to process variations at a very local level on a semiconductor wafer. In the prior art, the current mirrors had to be designed with this in mind, causing additional current to be wasted. With the invention, process restrictions are somewhat less significant because only the low side switches are controlling current. The high side switches must be more conductive and assuming a worst case beta of fifty has no effect on the controlled current because the high side switches are sure to be more conductive than the low side switches. A higher beta only means that the high side switches will be more conductive at a given bias.

The invention thus provides a more efficient EL driver, drawing less current than EL drivers with H-bridge outputs constructed in accordance with the prior art. Because die size can be reduced, the cost per die is reduced.

Having thus described the invention, it will be apparent to those of skill in the art that various modifications can be made within the scope of the invention. For example, the invention can be applied to bipolar or MOS transistors. The waveforms in FIGS. 4 and 6 are idealized for the purposes of illustration. One node might not remain absolutely constant while the other node varies. The fact remains that the voltages on the lamp terminals in a driver incorporating the invention are quite different from the voltages on the lamp terminals of a driver constructed in accordance with the prior art. A split power supply would change the level but not the shape of the waveforms illustrated in FIG. 6. One could "starve" the high side current mirrors in FIG. 3 (reduce the current from sources 37 and 39 to the absolute minimum) and still not obtain the same improved efficiency as in the invention, which relies on the beta of the switching transistor rather than current ratio in a current mirror.

What is claimed as the invention is:

1. In a driver for an electroluminescent lamp having a source of high voltage and an H-bridge output including two high side transistors, the improvement comprising:

a first transistor connected in cascade with a first high side transistor;

a second transistor connected in cascade with a second high side transistor;

whereby current mirrors for the high side transistors are eliminated.

2. In a driver for an electroluminescent lamp having a source of high voltage and an H-bridge output including two low side transistors, the improvement comprising:

current mirrors on only the low side transistors in said H-bridge output for limiting current during charge and discharge of the EL lamp.

3. A driver for an electroluminescent lamp, said driver comprising:

a source of high voltage having a first voltage rail and a second voltage rail;

an H-bridge output coupled to said source of high voltage;

said H-bridge output including a first transistor and a second transistor coupled in series between said rails and having a first junction therebetween, a third transistor and a fourth transistor coupled in series between said rails and having a second junction therebetween, wherein said first junction and said second junction are adapted to be connected to said electroluminescent lamp;

a fifth transistor connected in cascade with the first transistor;

a sixth transistor connected in cascade with the third transistor;

whereby current mirrors for the first and third transistors are eliminated.

* * * * *